(12) United States Patent
Muehlfeld (10) Patent No.: US 11,477,935 B1
(45) Date of Patent: Oct. 25, 2022

(54) AGRICULTURAL ZONE MANAGEMENT SYSTEM AND VARIABLE RATE PRESCRIPTION GENERATION

(71) Applicant: Sentera, Inc., Minneapolis, MN (US)

(72) Inventor: Andrew Muehlfeld, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 196 days.

(21) Appl. No.: 16/659,712

(22) Filed: Oct. 22, 2019

(51) Int. Cl.
| | |
|---|---|
| A01B 63/00 | (2006.01) |
| A01B 79/00 | (2006.01) |
| A01C 1/00 | (2006.01) |
| A01C 14/00 | (2006.01) |
| A01C 21/00 | (2006.01) |
| A01C 23/00 | (2006.01) |
| G01C 21/36 | (2006.01) |
| G05D 1/02 | (2020.01) |

(52) U.S. Cl.
CPC ......... *A01B 79/005* (2013.01); *G05D 1/0219* (2013.01); *G05D 1/0246* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 2018/0092295 A1* | 4/2018 | Sugumaran | .......... A01C 23/007 |
| 2021/0136994 A1* | 5/2021 | van Haaren | .......... A01B 79/005 |

* cited by examiner

*Primary Examiner* — Angela Y Ortiz
*Assistant Examiner* — Laura E Linhardt
(74) *Attorney, Agent, or Firm* — Hamre, Schumann, Mueller & Larson, P.C.

(57) ABSTRACT

An agricultural zone management system and methods where a variable rate prescription (VRP) includes a plurality of equipment zones of the agricultural field that are generated based on at least one treatment dimension of a farm implement to be used in the agricultural field, and each one of the equipment zones is further defined based on one or more of an intended direction of travel of the farm implement in the agricultural field, and an intended travel path of the farm implement in the agricultural field. In addition, a treatment plan, such as a treatment rate, can be generated based on the needs of plants, soil or the like in each equipment zone.

18 Claims, 10 Drawing Sheets

AGRICULTURAL ZONE MANAGEMENT SYSTEM AND VARIABLE RATE PRESCRIPTION GENERATION

FIELD

This disclosure relates to agricultural zone management systems and generating variable rate prescriptions for agricultural fields.

BACKGROUND

Current advanced farming techniques employed in precision agriculture use management zones with a variable rate prescription generated for each zone to determine how a treatment (for example, fertilizer, fungicide, herbicide, planting or the like) should be applied to different regions of a field. Management zones are often generated based on soil types, soil organic matter, and terrain variation of the field. Current management zones tend to be large in size, often measured in acres (thousands of square meters). For each zone, a prescription is generated to apply different rates of treatment, or to enable or disable treatment. As a farm implement travels across the field and as the implement crosses a zone boundary between management zones, the treatment is adjusted.

SUMMARY

An agricultural zone management system and methods are described where a variable rate prescription (VRP) includes a plurality of equipment zones of the agricultural field that are generated based on, for example, the capability of a farm implement and/or an uncertainty error associated with the farm implement or with a data source used to generate the VRP. In addition, a treatment plan for each equipment zone, for example a treatment rate, can be generated based on the needs of plants, soil or the like in each equipment zone.

The equipment zones described herein are much smaller in size than current management zones, allowing for more precise treatment of an agricultural field. The generation of the smaller equipment zones is facilitated by factors such as the use of high resolution imagery from unmanned aerial vehicles (UAVs) and associated sensors in precision farming, enhanced georeferencing accuracy through the use of real-time kinematic (RTK)-enabled UAVs and farm implements, and the increasing granularity of farm implement execution.

In one embodiment, an agricultural zone management system can include a variable rate prescription of an agricultural field stored in a non-transitory computer readable storage medium. The variable rate prescription can include a plurality of equipment zones of the agricultural field, where each equipment zone is defined based on at least one treatment dimension of a farm implement to be used in the agricultural field, and each one of the equipment zones is further defined based on one or more of an intended direction of travel of the farm implement in the agricultural field, and an intended travel path of the farm implement in the agricultural field.

In another embodiment, a method of generating a variable rate prescription of an agricultural field for an agricultural zone management system can include defining a plurality of equipment zones of the agricultural field, each equipment zone is defined based on at least one treatment dimension of a farm implement to be used in the agricultural field, and each equipment zone is further defined based on one or more of: an intended direction of travel of the farm implement in the agricultural field, and an intended travel path of the farm implement in the agricultural field. The method can further include storing the variable rate prescription including the plurality of equipment zones in a non-transitory computer readable storage medium.

DETAILED DESCRIPTION

The following describes an agricultural zone management system and methods where a variable rate prescription (VRP) is generated for an agricultural field. The VRP includes an identification of equipment zones of the agricultural field and a treatment plan for each equipment zone. In some embodiments, the equipment zones can be generated based on the capability of a farm implement that will be used to treat the field. For example, in one embodiment, the equipment zones can be based on one or more of: an intended direction of travel of a farm implement in the agricultural field, an intended travel path of the farm implement in the agricultural field, at least one treatment dimension of the farm implement, and at least one uncertainty or tolerance error associated with the farm implement. The uncertainty error may alternatively, or in addition, be associated with a data source, such as a UAV, a camera mounted on the UAV, a navigation sensor system of the UAV, or the like, used to generate the VRP. In addition, the treatment plan that is generated for each equipment zone is based on the treatment needs of plants, soil or like in each equipment zone.

An agricultural zone management system as used herein refers to one or more physical/structural elements useable in precision agriculture to implement a VRP of an agricultural field. Examples of physical/structural elements that can be part of the agricultural zone management system can include, but are not limited to, one or more of the following: a non-transitory computer readable storage medium on which the VRP(s) described herein is stored or saved; farm implements that treat an agricultural field; one or more individual treatment elements of the farm implement including, but not limited to, elements used for spraying such as a sprayer, a nozzle(s), flat fan nozzle(s), hollow cone nozzle(s), full cone nozzle(s), solid stream nozzle(s), pulsating nozzle(s), misting nozzle(s), drift guard nozzle(s), fine droplet, mid droplet and large droplet nozzle(s), dicamba drift nozzle(s), high pressure and low pressure nozzle(s), drop nozzle(s) for fertilizer, extended range flat fan, twin flat fan, turbo flood wide angle, flood nozzle wide angle, pressure gauges, fine and course screens, hydraulic pumps, mixing cones; elements used for tilling such as straight spike shank, left and right twist shank, sweep, standard shovel, waffle disc, concave and convex disc, rolling basket, deep ripping shanks; elements used for seeding such as gauge wheels, furrow opening and closing discs, furrow openers, mud scrapers, fertilizer tube orifices, packer wheel, trash whips, drag chains, pneumatic and hydraulic down force control, row shut off clutches; headers such as sickle, sickle bar, cutting knifes, grab chain, auger, draper canvas, pickup belts; elements used in or on a combine such as a feeder house chain, rotor, concaves, grates, chamfer, sieves, chopper, spreader, return elevator, clean grain elevator, unloading auger; elements used for sugar beet harvesting such as metal flails, rubber flails, scalpers, lifter wheels, potato chains, belted chains, roller bars, scrub chains, row finder; a disc(s); a prong(s); a tine(s); a cutter(s); and the like; a processor for example, a central processing unit (CPU), a graphics processing unit (GPU) or both, processor cores, compute nodes, etc., or a monitor/display on the farm implement that can execute the VRP(s); and a UAV and associated elements such as a camera mounted on the UAV, a navigation sensor system such as a Global Positioning System (GPS) of the UAV, an inertial measurement unit (IMU) of the UAV, and the like that are used to generate one or more images of the agricultural field.

A VRP as used herein refers to a plan that is developed for treating the agricultural field by defined equipment zones. The VRP identifies each equipment zone as well as at least one specific treatment plan for each equipment zone. In some embodiments, a VRP can be considered "multi-layer" in which different treatment plans are developed for the equipment zones. For example, a sprayer could carry multiple chemicals, so a first treatment plan can be developed to apply a first chemical, and a second treatment plan can be developed to apply a second chemical.

An equipment zone as used herein refers to a sub-part of an agricultural field being farmed with a size (i.e. area or square footage) that is less than the entire area of the agricultural field. The agricultural field will typically include a plurality of equipment zones or sub-parts which, when added together, approximately equal the area of the agricultural field being farmed. Areas within a field that are not farmed and thus are not part of the VRP can include, but are not limited to, a stand of trees or a waterway such as a pond or a creek. The equipment zones may have approximately equal sizes (i.e. areas or square footages) or the equipment zones may have different sizes. In some embodiments, each equipment zone is defined based on one or more physical, mechanical and/or operational characteristics of a farm implement that is intended to be used to treat the farmable area of the agricultural field using the developed VRP. For example, each equipment zone may be based on one or more of (or any combination of): an intended direction of travel of the farm implement in the agricultural field, an intended travel path of the farm implement in the agricultural field, at least one treatment dimension of the farm implement, and at least one uncertainty error. The uncertainty error can be an error associated with the farm implement. In another embodiment, the uncertainty error can be associated with a data source, such as a UAV, a camera mounted on the UAV, a navigation sensor system of the UAV, an IMU of the UAV, or the like, or the uncertainty error can be associated with a data processing step such as generating a georeferenced raster image by stitching images or generating a georeferenced raster image by direct georeferencing images, or the like, that is used to generate the VRP. In one embodiment, each equipment zone can be the smallest possible size (for example, in the dimension parallel to the direction of travel and/or in the dimension perpendicular to the travel direction and/or in a dimension that is at an angle to the direction of travel) for which the farm implement can execute a distinct treatment plan. The equipment zones may overlap one another (some or all of the equipment zones could overlap) or there could be gaps between equipment zones (there could be gaps between all or some of the equipment zones).

The terms farm implement and farm equipment are used herein synonymously. The term farm implement will primarily be used. A farm implement may also be referred to as agricultural machinery. A farm implement can be any mechanical implement used in agricultural farming. A farm implement can include a motorized vehicle such as a tractor, as well as a non-motorized device that is pulled or pushed by a motorized vehicle. Examples of farm implements include, but are not limited to, tractors, combines, harvesters, tillers such as plows, seeders such as planters, cultivators, sprayers, spreaders, balers, spray plane, drones, single disc air seeders, double disc air seeder, shovel air seeders, strip tiller, ridge tiller, chisel plow, deep ripper plows, rolling baskets, rotary hoes, row crop cultivator, rock roller, draper headers, flex headers, straight headers, sunflower headers, edible bean harvesters, corn stripper head, corn knife cutting head, corn mower cutter head, pickup header, swather, multi-weeder, stalk chopper, ditch mower, sickle blade, self-propelled spreader, pull behind spreader, manure spreaders, liquid manure knife cultivators, grain cart, sugar beet cart, sugar beet harvester, sugar beet defoliator, potato harvester, grain storage baggers, straight spike shanks, twist shanks, scrapers, tile plow, cotton picker, irrigation pivots, salford tiller, 20 inch planter, 22 inch planter, 30 inch planters, silage chopper, hay rake, harrow, rototiller, mulch tiller, subsoiler, straight trucks, semi-trucks, hopper bottom trailer, end dump trailer, live bottom trailer, side dump trailer, belly dump trailer, seed tender, rice huller, reaper-binder, sugarcane harvester, carrot harvester, over-the-row mechanical harvester for apples, grape harvester, mechanical tree shaker, bale lifter, bale wrapper, hay tedder, 2wd tractor, 4wd tractor, MFWD tractor, row track, quad track, dual track, all in one sugar beet topper lifter cart. The farm implement can also include a computer, a controller, a monitor/display that is mounted on the farm implement, for example in the cab of a tractor.

Figure 1:
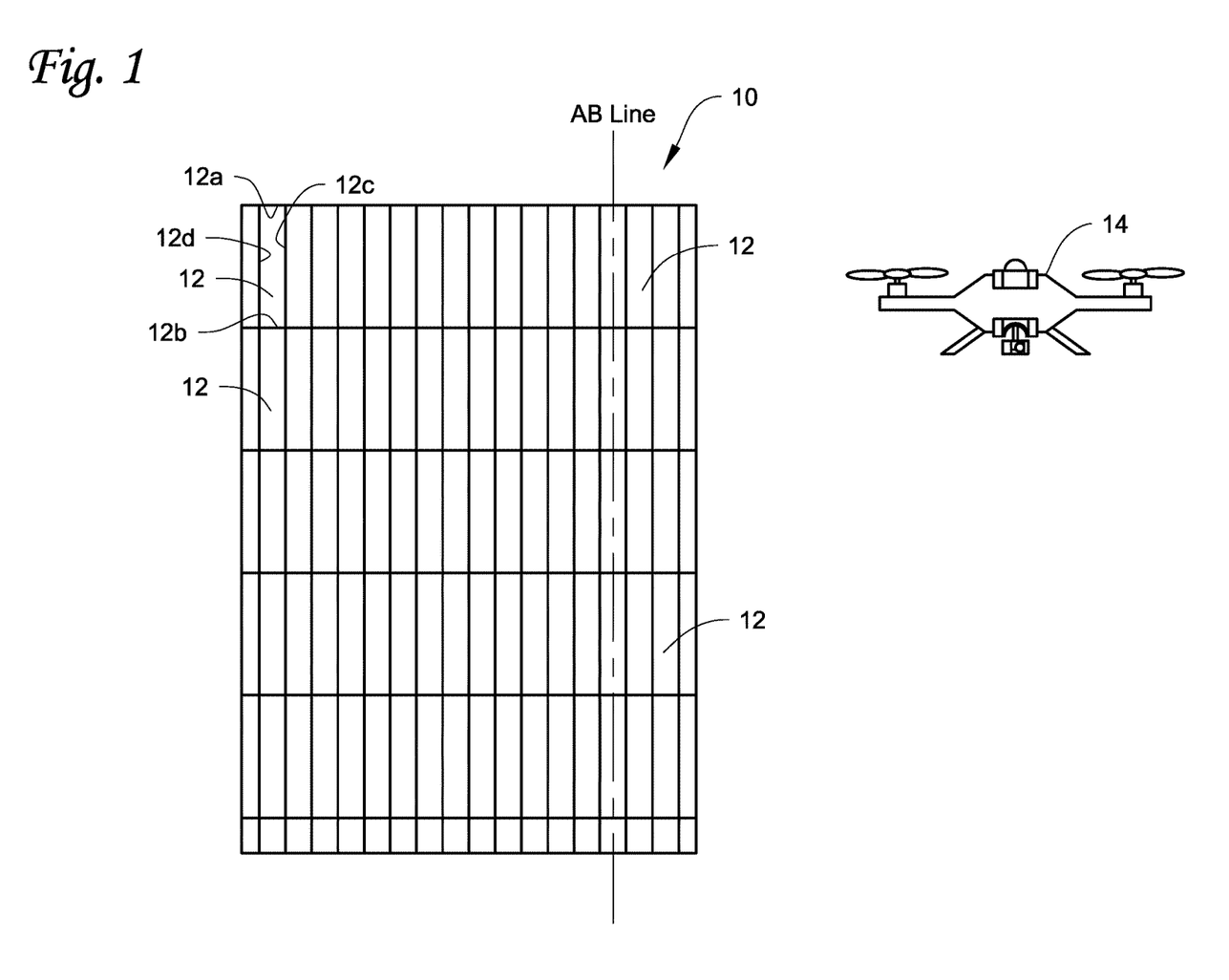
FIG. 1 depicts an image of an agricultural field with an example of equipment zones described herein indicated on the image.

Referring to FIG. 1, an image of an agricultural field 10 is illustrated with one example of a plurality of equipment zones 12 described herein indicated on the image of the field 10. In one embodiment, the image of the agricultural field 10 of interest can be obtained using an unmanned aerial vehicle (UAV) 14 that flies over the field 10 and collects images using a camera. The images are then collated together, for example using known image stitching or direct georeferencing techniques, to form a single image of the field 10. The equipment zones 12 for the field 10 can be defined (before or after the image is obtained) as described further herein and possibly overlaid onto a displayed image of the field 10 as in FIG. 1.

In the example illustrated in FIG. 1, the equipment zones 12 are depicted as being a grid of generally equal sized rectangles, with each zone 12 having a first end 12a, a second end 12b, a first side 12c, and a second side 12d generally parallel to the first side 12c. In the illustrated example, each zone 12 abuts another zone 12 along at least one of the ends 12a, 12b and/or along at least one of the sides 12c, 12d. However, the equipment zones 12 may overlap one another or there could be gaps between equipment zones 12 (for example, gaps between one or both of the ends 12a, 12b and/or gaps between one or both of the sides 12c, 12d). In the illustrated example, the rectangular equipment zones 12 are elongated from the end 12a to the end 12b whereby the dimension between the ends 12a, 12b is greater than the dimension between the sides 12c, 12d. The equipment zones 12 can have shapes other than rectangular, and some or all of the equipment zones 12 can be curved (completely or partially) from one end 12a to the other end 12b.

Figure 2:
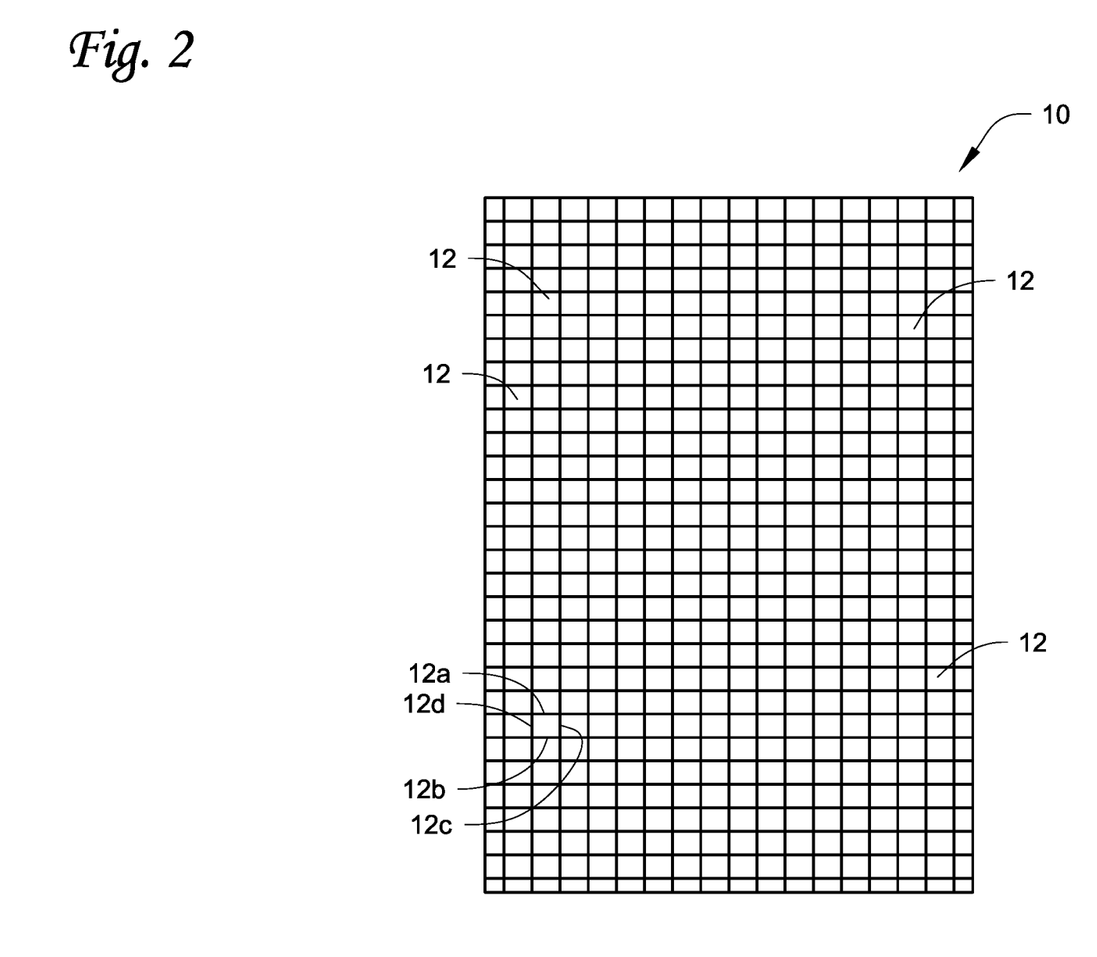
FIG. 2 depicts another image of an agricultural field with another example of equipment zones described herein indicated on the image.

FIG. 2 illustrates another embodiment where the image of the agricultural field 10 is illustrated with another example of a plurality of the equipment zones 12 indicated on the image of the field 10. In this embodiment, the equipment zones 12 are smaller in size (i.e. area) than the size (i.e. area) of the equipment zones 12 in FIG. 1. For example, the equipment zones 12 in FIG. 2 are generally square, or the dimension between the sides 12c, 12d is greater than the dimension between the ends 12a, 12b.

As indicated above, the equipment zones 12 can be determined or generated based on the capability of a farm implement that will be used to treat the field 10 in some manner. Because the equipment zones 12 can be based on a capability of the farm implement, the equipment zones 12 can be made smaller than traditional management zones, allowing more granular and precise treatments of the field. The width of the equipment zones can be based on a width of a mechanical characteristic of the farm implement, while the length of each equipment zone can be based on factors such as the expected travel speed of the farm implement and the speed with which the treatment elements of the farm implement can be adjusted. The length of each equipment zone can also be arbitrarily selected.

Figure 3:
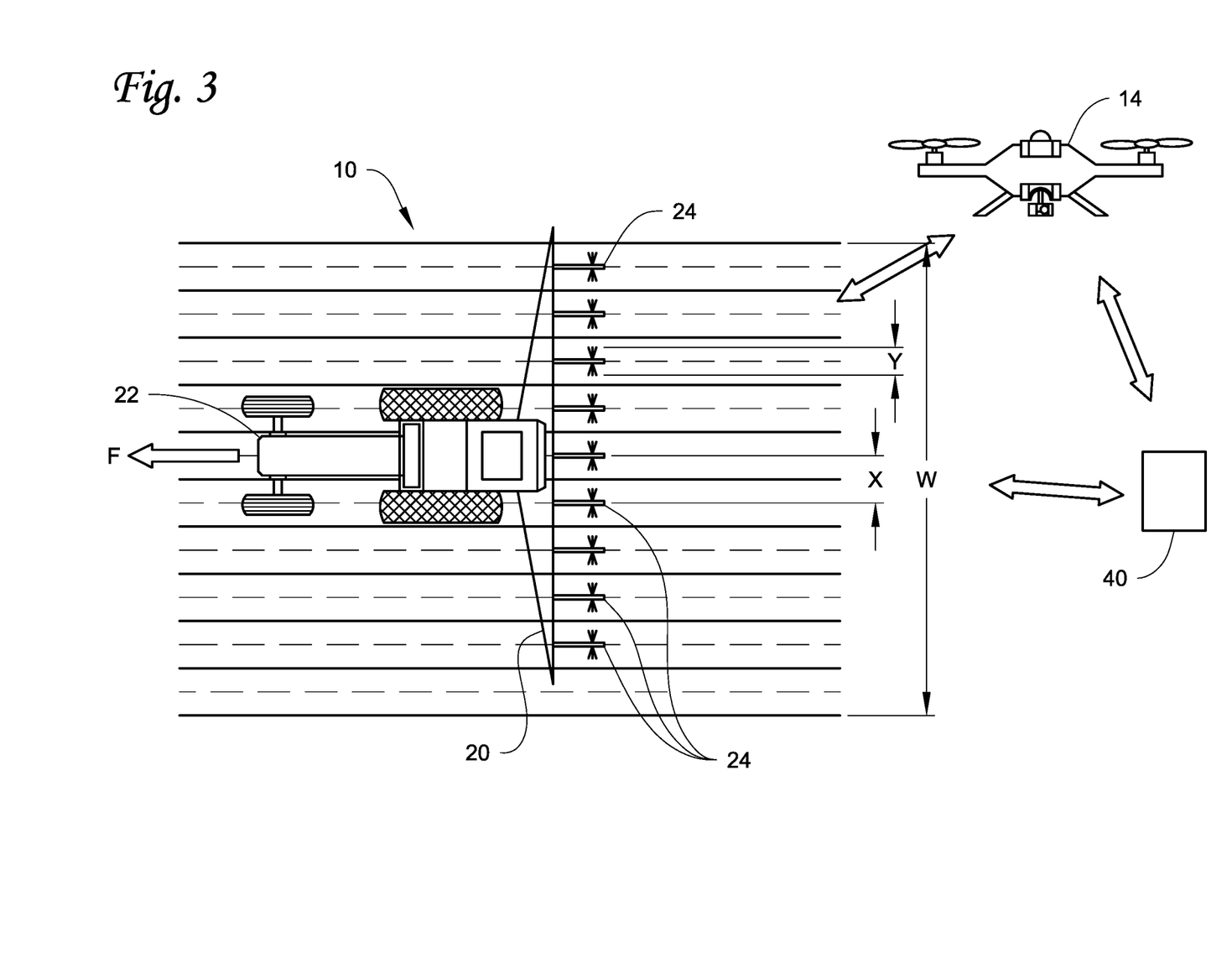
FIG. 3 is a top view of a farm implement that includes a farm tractor pulling a sprayer relative to equipment zones described herein.
Figure 4:
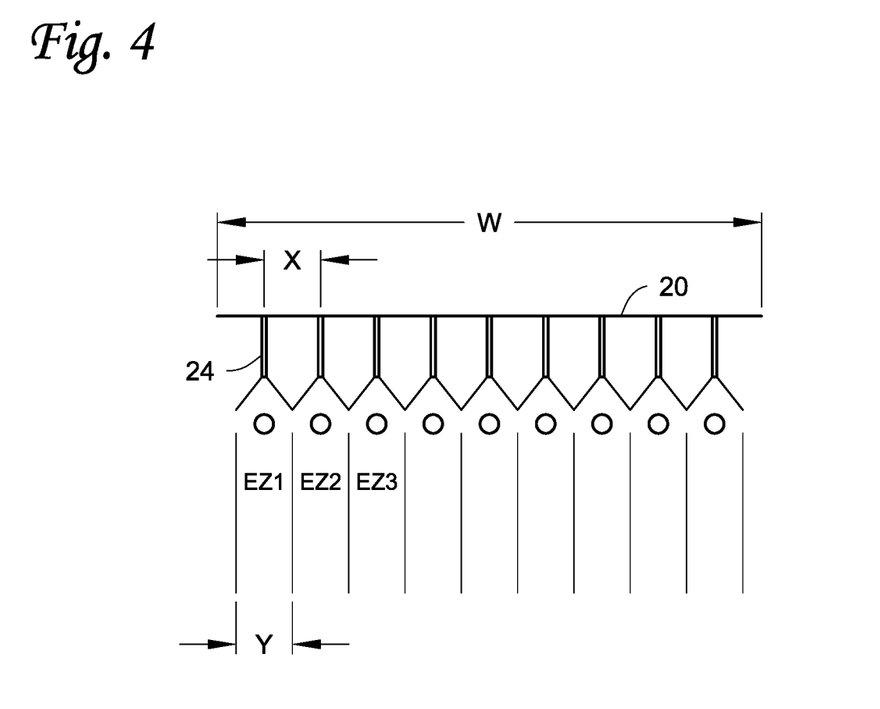
FIG. 4 is a detailed view of a group of individual treatment elements in the form of spray nozzles of the sprayer of FIG. 3.

An example of determining the equipment zones is illustrated in FIGS. 3 and 4. This example depicts a farm implement in the form of a sprayer 20 being pulled by a tractor 22 through the field 10. The sprayer 20 includes a plurality of individual spray nozzles 24 (also referred to as treatment elements) spaced along the width W thereof, generally perpendicular to the direction of travel F of the tractor 22. There is a nominal distance X between each spray nozzle 24, and each spray nozzle 24 has a nominal spray width Y (also referred to as a treatment size).

For example, the direction of each equipment zone 12 (i.e. the direction of each grid line depicted in FIGS. 1 and 2 that define the sides 12c, 12d) can be based on the intended direction of travel F of the tractor 22 and thus the direction of travel of the sprayer 20 being pulled by the tractor 22. Alternatively, the direction of each equipment zone 12 (i.e. the direction of each grid line in FIGS. 1 and 2 that define the sides 12c, 12d) can be based on the travel path (often termed guidance lines or AB lines shown in FIG. 1) of the sprayer 20 and tractor 22, which is the direction of travel F and the centerline of the implement. The travel path could also be a boundary of the field 10.

In some embodiments, the equipment zones 12 can be determined based on controlled traffic farming, also called tramline farming, in which the travel path is the same for every different piece of equipment that moves through the agricultural field year after year. Sometimes there are many guidance lines for one agricultural field. For example, there are usually two guidance lines, one for most of the field, and one for the "headlands" (i.e. the portion planted perpendicular to most of the agricultural field, which can be the equipment turnaround area for the passes done over most of the agricultural field). There will typically be headlands at two edges of the agricultural field, or along waterways, where one pass of the equipment is done perpendicular to the primary passes, or along a curve. In these cases, the equipment zones may be defined differently in the headlands, even if the exact travel path isn't known.

The "travel path" can be derived from one or more guidance lines (or the A-B lines). One A-B line, together with a distance between the centerline of each pass of the equipment, can define the travel path of many passes of the equipment, each subsequent equipment pass being parallel to the initial A-B line at a distance from the previous equipment pass substantially equal to the distance between the centerlines of each pass. This is illustrated in FIG. 3 which shows the tractor 22 and the sprayer 20 in dashed lines on a second pass after turning around in a headlands (not shown) after completing the initial pass to the left in FIG. 3.

Each equipment zone 12 can also be based on at least one treatment dimension of the farm implement such as the sprayer 20. For example, the width of each equipment zone 12 (i.e. the spacing between the sides 12c, 12d) can be generally equal to the width W of the sprayer 20, or some fraction of the width W. Alternatively, the width of each equipment zone 12 can be generally equal to, or some fraction or multiple of, the distance X between each spray nozzle 24, or generally equal to, or some fraction or multiple of, the spray width Y of each nozzle 24. FIG. 4 illustrates an example of the width of equipment zones 12 (labeled EZ1, EZ2, EZ3, etc.) being based on the spray width Y of each nozzle 24.

So in general, in one embodiment, the farm implement can have a width, and the at least one treatment dimension of the farm implement can be equal to or less than the width. In another embodiment, the farm implement can have a plurality of treatment elements with each treatment element having a treatment size, and the at least one treatment dimension of the farm implement equals the treatment size which equals the width of the equipment zones. In another embodiment, the farm implement can have a treatment width, and the at least one treatment dimension of the farm implement equals the treatment width which equals the width of the equipment zones. In another embodiment, the farm implement can have a treatment width, and the at least one treatment dimension of the farm implement is less than the treatment width.

Each equipment zone 12 can also be based on at least one uncertainty error. The uncertainty error can be one or more of an uncertainty error of the farm implement, an uncertainty error in a data source that is used to generate the VRP, or a geospatial uncertainty error. For example, in the case of the sprayer 20, the spray width Y may vary over time as the spray nozzles are used. Therefore, the equipment zones may be defined to account for, i.e. factor in, changes in the dimensions X and/or Y over time. Additional examples of uncertainties associated with the sprayer 20 include, but are not limited to: delays or errors in turning-on/turning-off the spray nozzles from when a turn-on/turn-off command is sent; GPS position errors of the tractor 22; errors in the distance between the GPS sensor on the cab of the tractor 22 and the spray nozzles 24; swaying of the sprayer 20 and the spray nozzles 24 thereof; geospatial errors in the data obtained by the UAV and used to assign treatment rates to each equipment zone; differences in coordinate reference system offsets between data source(s), such as a GPS sensor on the UAV, used to generate the VRP, and a GPS sensor on the farm implement; and other uncertainties.

Figure 6:
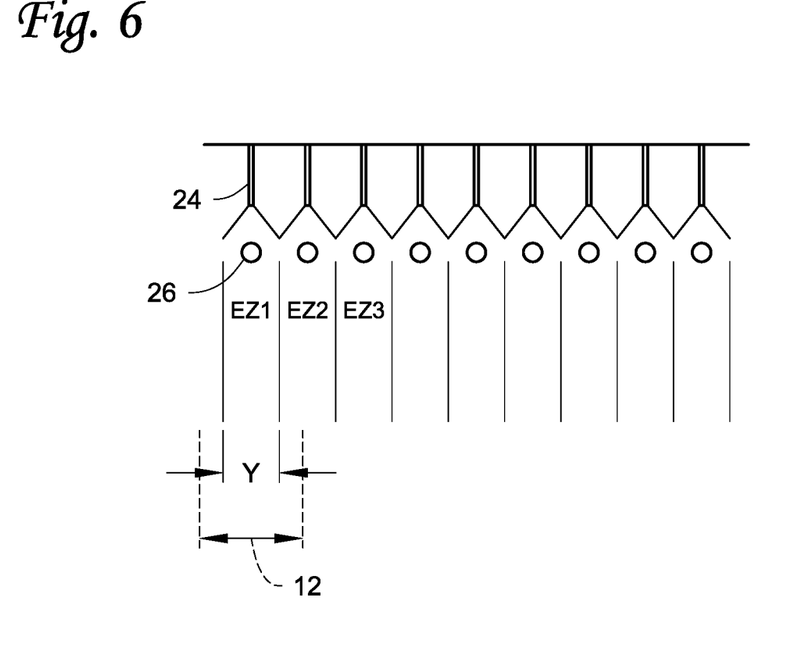
FIG. 6 is a detailed view similar to FIG. 4 illustrating an example of uncertainty error when defining the equipment zones.

Due to uncertainty, the equipment zones 12 can be increased or decreased in size (from side 12a to side 12b and/or from end 12a to end 12b) to account for the uncertainty. For example, FIG. 6 is a view similar to FIG. 4 showing expansion of the equipment zones. In this example, each equipment zone is initially defined as the width Y of the spray from one of the spray nozzles 24. However, because of uncertainty in the actual spray width Y, possible reduction in the spray width Y over time, the impact of wind on the spray width Y, and other possible uncertainties, the size of each equipment zone 12 is increased (as indicated in dashed lines) to ensure that the spray from two spray nozzles 24 actually falls onto the plants 26 in one row. So this example ensures that the plants 26 in the center of the equipment zone are treated.

Figure 7:
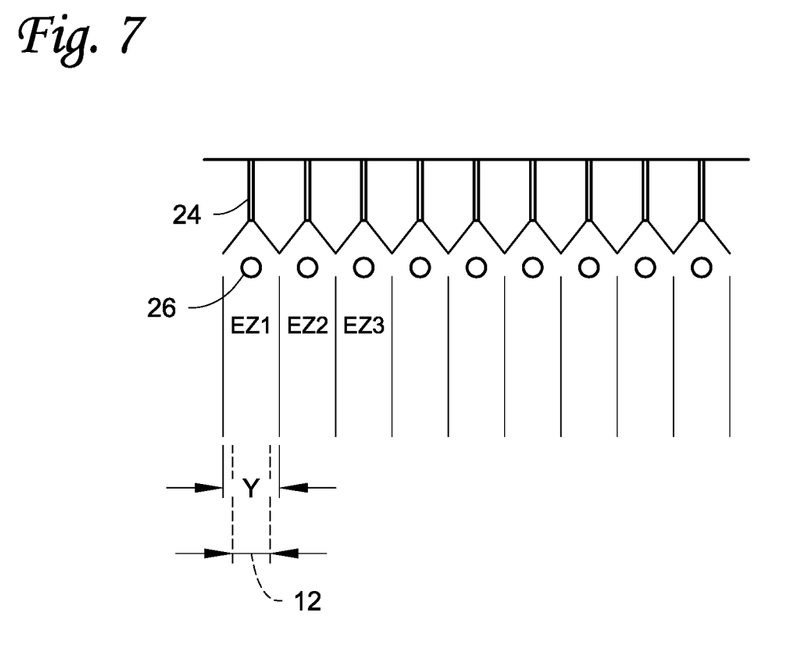
FIG. 7 is a detailed view similar to FIG. 4 illustrating another example of uncertainty error when defining the equipment zones.

FIG. 7 is a view similar to FIGS. 4 and 6 but showing reduction of the equipment zones. In this example, each equipment zone is initially defined as the width Y of the spray from one of the spray nozzles 24. However, because of uncertainty in the actual spray width Y, possible reduction in the spray width Y over time, the impact of wind on the spray width Y, and other possible uncertainties, the size of each equipment zone 12 is reduced (as indicated in dashed lines) to ensure that the spray from one spray nozzle 24 falls only onto the plants 26 in one row.

Figure 9:
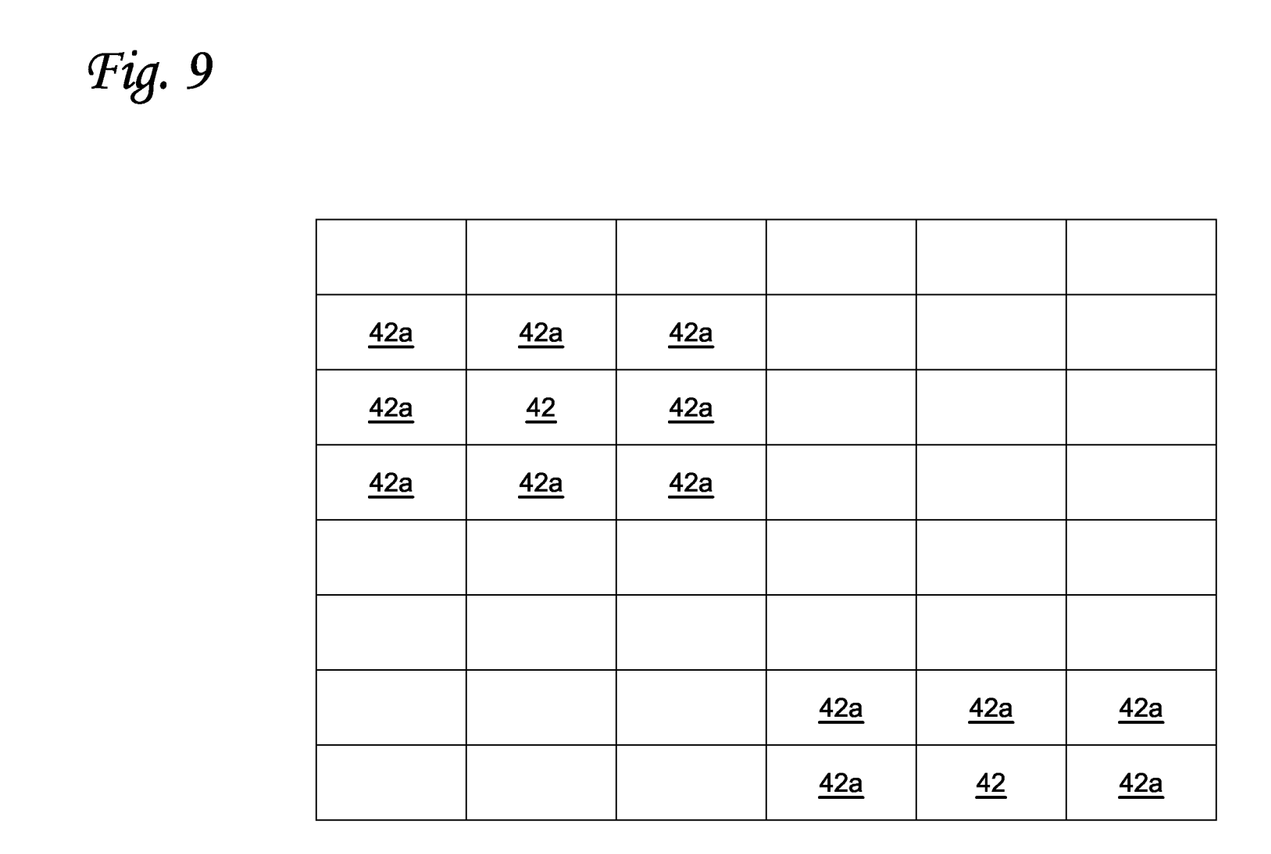
FIG. 9 illustrates an example of accounting for uncertainty by populating neighboring equipment zones with the same treatment.

Another option to account for uncertainty is to keep the equipment zone sizes, but populate one or more neighboring equipment zones with the same treatment. For example, referring to FIG. 9, one can assign all of the equipment zones, for example equipment zones 42, that contain a weed with a spraying rate. The same or similar spraying rate can then be applied to one or more of the neighboring equipment zones that border on the equipment zone 42, for example equipment zones 42a. The neighboring equipment zones 42a can be located to the left and/or to the right of the equipment zone 42, in front of and/or to the back of the equipment zone 42, along one or both diagonals of the equipment zone 42, or any combination thereof.

Figure 10:
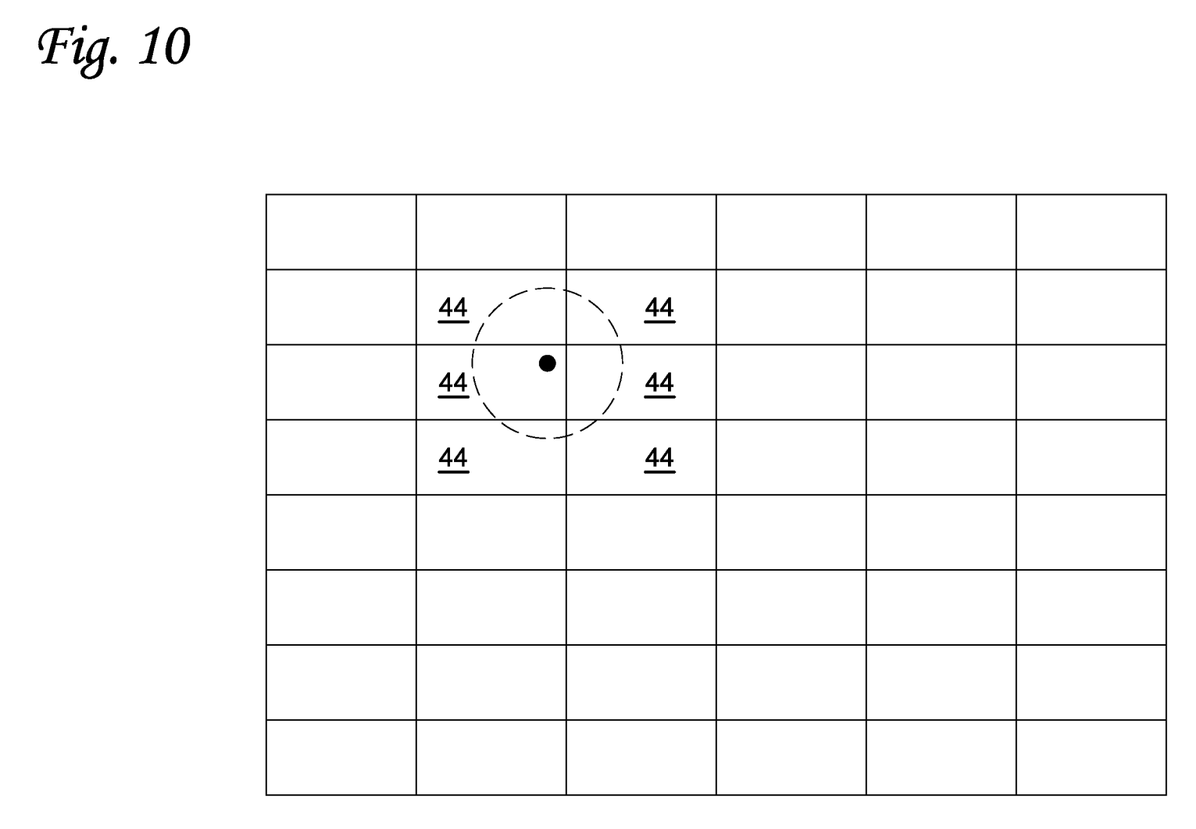
FIG. 10 illustrates an example of accounting for uncertainty based on a zone of uncertainty.

With reference to FIG. 10, another option is to extend the location of the weed found in the data source spatially to cover all of an uncertainty error, prior to assigning a treatment rate to each equipment zone. For example, FIG. 10 illustrates the location 43 of a weed in one of the equipment zones. The dashed line circle indicates a zone of uncertainty around the weed location 43 to account for uncertainty in the actual location of the weed based on uncertainty errors in the data source used to locate the weed. The same treatment, in this case spray rate, is then assigned to each of the equipment zones 44 in which the zone of uncertainty falls to ensure that the weed is treated.

Figure 11:
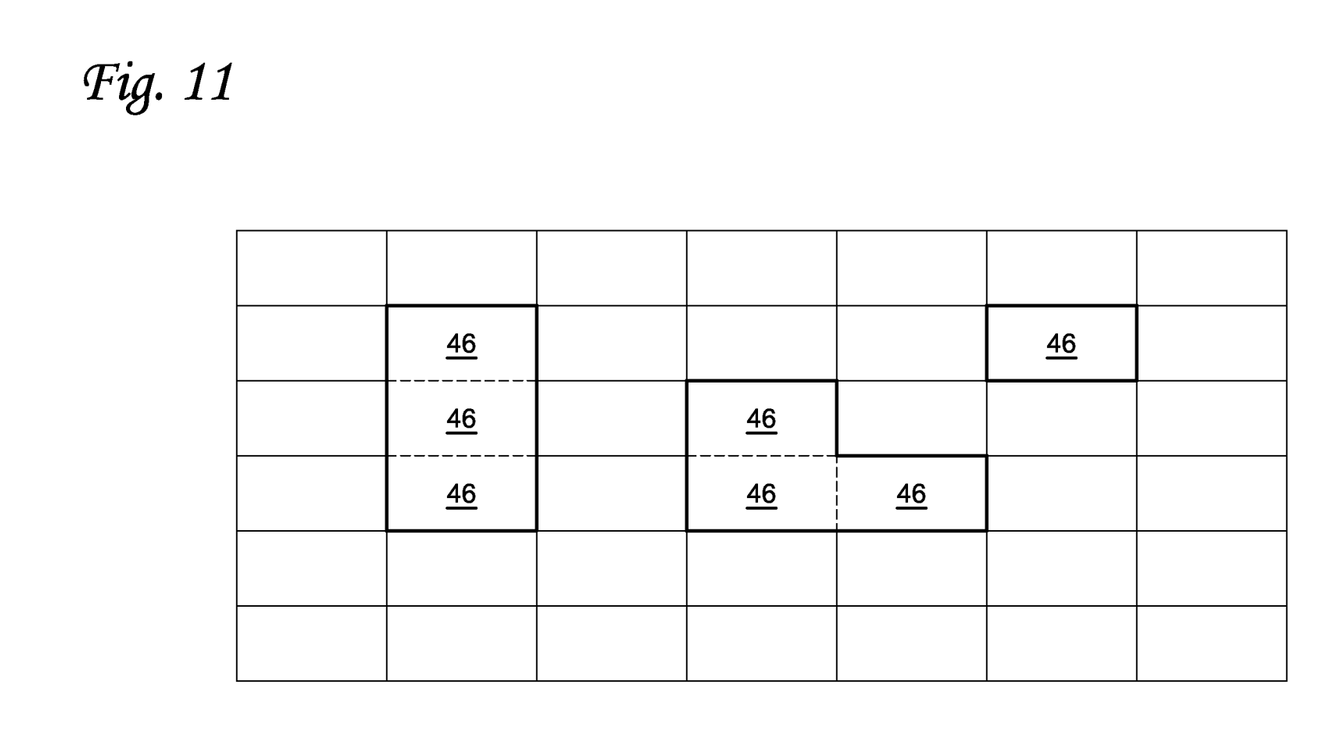
FIG. 11 illustrates an example of merging adjacent equipment zones that have the same treatment plans.

FIG. 11 illustrates an example where some adjacent equipment zones 46 have the same assigned treatment plans. In this instance, the adjacent equipment zones 46 can be combined or merged together to form one larger equipment zone from the adjacent equipment zones 46 with the same treatment plans.

The start and stop (i.e. the ends 12a, 12b) of the equipment zones 12, which define the length of the equipment zones 12, can also be determined based on the capability of the farm implement. For example, the ends 12a, 12b can be determined based on the expected travel speed of the implement while treating the field. The distance between the ends 12a, 12b can also be varied to account for uncertainty or variations in the actual travel speed of the implement during treatment. The ends 12a, 12b can also be determined based on how quickly the treatment elements of the farm implement can be adjusted from zone to zone. For example, if the farm implement is the sprayer discussed above, how quickly the output from the spray nozzles can be adjusted when transitioning from one equipment zone to the next can dictate the ends 12a, 12b. The ends 12a, 12b can also be determined based on analysis of the images of the field obtained by the UAV 14. The ends 12a, 12b may also be arbitrarily determined. In some embodiments, the treatment rates for the equipment zones could vary continuously in the direction of travel in which case there may not be defined ends 12a, 12b except at the ends of the agricultural field. The ends 12a, 12b could also be determined based on an effect (e.g. weed, residue, pest) in the agricultural field to ensure there is enough transition time before and after the effect.

Figure 5:
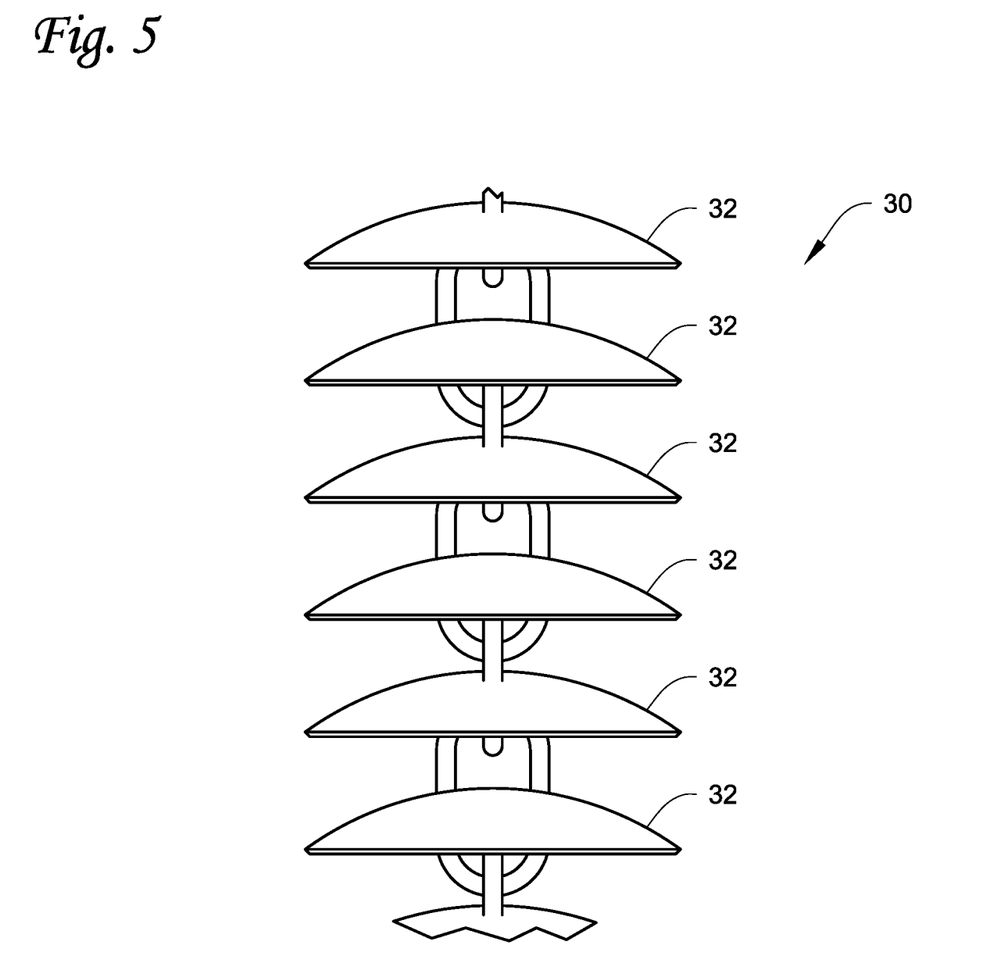
FIG. 5 illustrates a portion of another example of a farm implement treatment element in the form of a disc harrow.

Many variations of determining the equipment zones 12 based on the capability of a farm implement that will be used to treat the field 10 in some manner are possible. In addition, the type of farm implement used can also vary greatly. FIG. 5 illustrates an example of a farm implement in the form of a disc harrow 30 that can be pulled behind a tractor. The disc harrow 30 includes a plurality of spaced discs 32. With this type of farm implement, the equipment zones could be based on the intended direction of travel of the tractor pulling the disc harrow 30, the travel path of the tractor, the depth that the discs 32 are intended to penetrate the soil, the spacing between the discs 32, the length of the disc harrow 30, the width of the discs 32, and the like.

A treatment plan is also determined for each equipment zone. Treatment plan refers to how each equipment zone will be treated by the farm implement or the individual elements of the farm implement. For example, a treatment plan could be a treatment rate, i.e. a rate at which a material is applied to the soil or to crops growing in the soil, or a rate at which seeds are planted, or a rate at which plants are planted. A treatment plan could also dictate how soil is tilled in the associated equipment zone, such as the depth of tilling. The treatment plan can encompass any type of treatment that one may wish to conduct within each associated equipment zone.

Treatments encompassed by the techniques described herein include, but are not limited to: fertilizing; seeding; herbicide application; pesticide application; planting rate; planting/no planting; fungicide application; tilling; watering; harvesting; drip irrigation; ridge tilling; no till, cover crop planting; flood irrigation; combining; drop nozzle fertilizer; side dresser fertilizer; spray plane; anhydrous knife incorporation; floated on dry fertilizer; in furrow liquid fertilizer; pre-emerge herbicide; post emergence herbicide; burn down herbicide; band spraying; broadcast spraying; manure spreading; and the like.

As indicated above, the VRP can be considered "multi-layer" in which a single VRP includes different types of treatment plans that are developed for the equipment zones. For example, one treatment plan can be developed for the equipment zones so that the equipment zones are treated generally in one manner, for example by applying a first chemical to treat a first type of weed. In addition, a second treatment plan can be developed for the equipment zones so that the equipment zones are treated generally in a second manner, for example by applying a second chemical to treat a second type of weed. The single VRP can include third, fourth, etc. treatment plans that are developed for the equipment zones. In one embodiment, the treatment plans can be implemented in sequence, whereby a first treatment plan is implemented on all of the equipment zones, followed by implementing a second treatment plan on all of the equipment zones. In another embodiment, the treatment plans can be implemented simultaneously, whereby each equipment zone is treated as dictated by the first and second treatment plans as the farm implement progresses into, through and from each equipment zone.

The treatment plans for the equipment zones may be determined based on elements such as analysis of images of the field, soil type, weather, and other elements, and determining details of the treatment plan that would be suitable for each equipment zone. The treatment plans can be manually determined and manually generated by a user. The treatment plans can also be automatically determined and generated based upon automated analysis of the images, soil type, weather, and the like, and automatic selection of an appropriate treatment plan. The treatment plans can be developed both automatically and manually, and combinations thereof. The treatment plan could be based on the "average" of what's observed in each equipment zone, for example from the photographs obtained by the UAV. Alternatively, the treatment plan could be based on the "worst case" of what's observed in each equipment zone, i.e. there could be one location in an equipment zone with a severe problem so the treatment plan for that entire equipment zone could be set to address this severe problem. In another embodiment, outliers or noise may be filtered out or to provide an appropriate treatment that balances the average and worst case. For example, the treatment plan can be determined from the $75^{th}$ percentile and/or $90^{th}$ percentile worst case measurement within the equipment zone. In another embodiment, the data within each equipment zone can be preprocessed to filter out noise and/or outliers.

With reference back to FIG. 3, the UAV 14 (shown schematically) can be in wireless communication with the farm implement 20, 22 as well as in wireless communication with a remote system 40. Operation of the UAV 14 can be controlled by the remote system 40, and images gathered by a camera on the UAV 14 can be transmitted to the remote system 40 for subsequent processing and analysis of the images. The images may alternatively be stored on a suitable data storage device on the UAV 14, and downloaded from the data storage device when the UAV 14 lands, for example by connecting a cable to the UAV 14 or removing the data storage device. The processing and analysis of the images can occur on the remote system 40 or at a separate location. The VRP may also be generated by and/or stored on the remote system 40. The VRP may then be downloaded to a suitable computer on the farm implement for implementation. The UAV 14 may also be in real-time communication with the farm implement 20, 22, for example streaming real-time images or video from the UAV 14 to the farm implement 20, 22 to allow the farm implement 20, 22 to see the results of the treatment applied to the field. The farm implement 20, 22 and the remote system 40 may also be in communication with one another. For example, the VRP may be stored on the remote system 40, and the VRP is served to the farm implement 20, 22 from the remote system 40.

Figure 8:
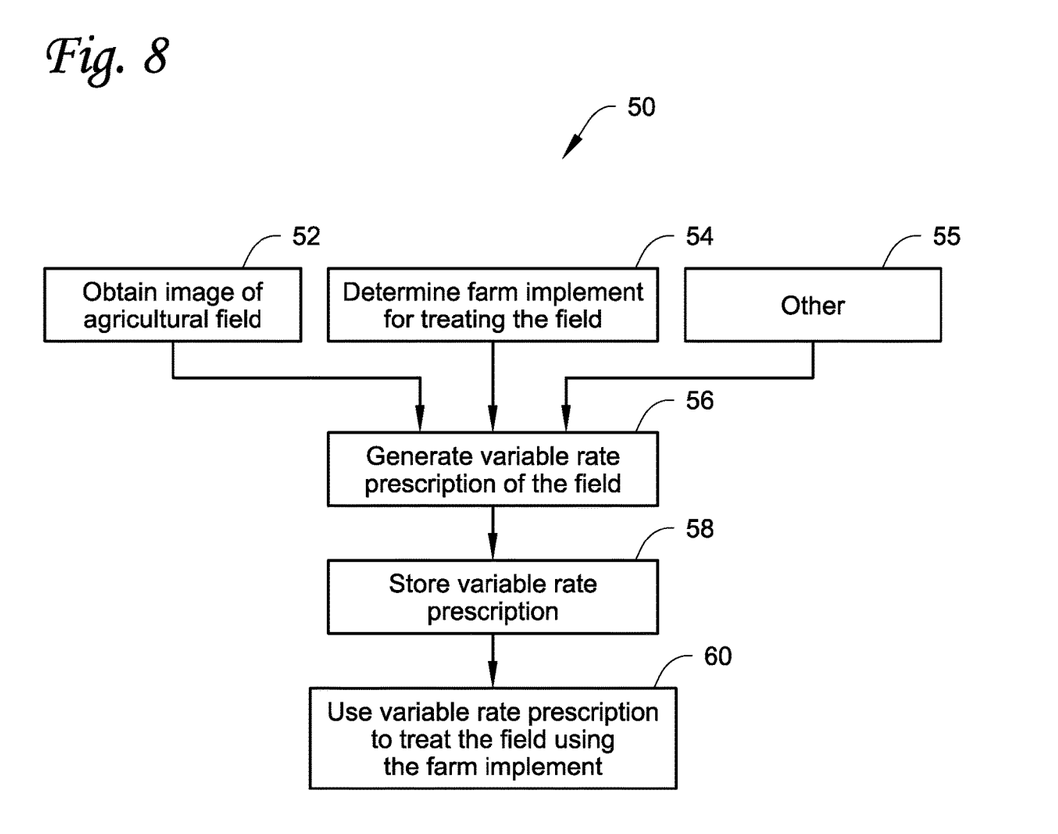
FIG. 8 illustrates a VRP generation method described herein.

FIG. 8 illustrates one example of a method 50 of generating and using a variable rate prescription that implements the techniques described herein. In the method 50, an image of the agricultural field is obtained at 52. In addition, the farm implement to be used to treat the field, which will determine the treatment dimension to be used and any uncertainty of the farm implement to be factored in, can be determined at 54. Further, other information that may be useful for generating the VRP, such as the intended direction of travel of the farm implement in the agricultural field, the intended travel path of the farm implement in the agricultural field, and any additional uncertainty to be factored in, can be determined at 55. The steps 52, 54, 55 can take place in any order or simultaneously.

The VRP for the field is then generated at 56 using one or more of the steps 52, 54, 55. As described above, the VRP includes the equipment zones and the treatment plan to be used for each equipment zone, each of which can be determined based on the image(s) obtained in step 52 and analysis of that image. In addition, the VRP can be based on one or more physical, mechanical and/or operational characteristics of the farm implement determined in step 54 and/or based on other information obtained in step 55.

The VRP that is generated is then stored at 58. The VRP can be stored at the remote system 40 and/or at any other suitable location. The VRP can be stored in any suitable non-transitory computer readable storage medium. In some embodiments, the VRP may be downloaded from a storage location and then stored on the farm implement for execution. In some embodiment, the farm implement may access the non-transitory computer readable storage medium in order to access and implement the VRP. In some embodiments, the non-transitory computer readable storage medium can be on the farm implement, or the non-transitory computer readable storage medium can be remote from the farm implement. In other embodiments, the VRP can be downloaded from the non-transitory computer readable storage medium and stored on a portable storage device, such as a thumb drive (also known as a flash drive, USB flash drive, data stick, pen drive, jump drive, and the like) which is then plugged into the farm implement.

At 60, the VRP is then used to treat the field using the farm implement. The VRP controls the farm implement to apply the desired treatment plan to each equipment zone. As the implement travels and moves from one equipment zone to another equipment zone, the VRP causes the farm implement to adjust its treatment to the treatment plan of the next equipment zone to ensure precise and appropriate treatment in each equipment zone.

In some embodiments, the VRP described herein can be modified/over-ridden in real-time by the person operating the farm implement. For example, the operator may be operating the farm implement and see something coming up in the field that is out of the ordinary and for whatever reason not previously factored into the VRP, and that may need a different treatment than what will be implemented under the VRP. So the operator can manually adjust the treatment, either temporarily or permanently. If temporarily, the farm implement may automatically revert back to the VRP or only revert back to the VRP upon a command entered by the operator.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An agricultural zone management system, comprising:
   a variable rate prescription of an agricultural field stored in a non-transitory computer readable storage medium, the variable rate prescription includes:
   a plurality of equipment zones of the agricultural field, where each one of the equipment zones is defined based on at least one treatment dimension of a farm implement to be used in the agricultural field, and
   each one of the equipment zones is further defined based on one or more of:
   an intended direction of travel of the farm implement in the agricultural field, and an intended travel path of the farm implement in the agricultural field; and
   the farm implement that includes the non-transitory computer readable storage medium, and the farm implement is configured to treat the agricultural field based on the variable rate prescription.

2. The agricultural zone management system of claim 1, where each one of the equipment zones is further defined based on at least one uncertainty error.

3. The agricultural zone management system of claim 1, wherein the variable rate prescription further comprises at least one treatment plan for each equipment zone.

4. The agricultural zone management system of claim 1, wherein the variable rate prescription is multi-layer where at least one of the equipment zones has a first treatment plan and a second treatment plan associated therewith.

5. The agricultural zone management system of claim 1, wherein the farm implement has a width, and the at least one treatment dimension of the farm implement is less than the width.

6. The agricultural zone management system of claim 1, wherein the farm implement has a plurality of treatment elements, each treatment element having a treatment size, and the at least one treatment dimension of the farm implement equals the treatment size.

7. The agricultural zone management system of claim 1, wherein the farm implement has a treatment width, and the at least one treatment dimension of the farm implement equals the treatment width.

8. The agricultural zone management system of claim 1, wherein the farm implement has a treatment width, and the at least one treatment dimension of the farm implement is less than the treatment width.

9. The agricultural zone management system of claim 1, wherein the farm implement is a sprayer or a planter.

10. The agricultural zone management system of claim 2, wherein the at least one uncertainty error comprises a coordinate reference system offset between a global positioning system sensor on the farm implement, a data source used in generating the variable rate prescription, or a data processing step used in generating the variable rate prescription.

11. A method of generating a variable rate prescription of an agricultural field for an agricultural zone management system, comprising:
    defining a plurality of equipment zones of the agricultural field, each equipment zone is defined based on at least one treatment dimension of a farm implement to be used in the agricultural field, and each equipment zone is further defined based on one or more of: an intended direction of travel of the farm implement in the agricultural field, and an intended travel path of the farm implement in the agricultural field;
    storing the variable rate prescription including the plurality of equipment zones in a non-transitory computer readable storage medium; and
    using the generated variable rate prescription to treat each equipment zone of the agricultural field.

12. The method of claim 11, further comprising defining each one of the equipment zones based on at least one uncertainty error.

13. The method of claim 11, further comprising assigning at least one treatment plan for each equipment zone, and storing the variable rate prescription includes storing the at least one treatment plan for each equipment zone in the non-transitory computer readable storage medium.

14. The method of claim 11, wherein the variable rate prescription is multi-layer where at least one of the equipment zones is assigned a first treatment plan and a second treatment plan.

15. The method of claim 12, wherein the at least one uncertainty error comprises a coordinate reference system offset between a global positioning system sensor on the farm implement, a data source used in generating the variable rate prescription, or a data processing step used in generating the variable rate prescription.

16. The method of claim 11, comprising assigning a first treatment plan and a second treatment plan to at least one of the equipment zones.

17. The method of claim 11, wherein the farm implement is a sprayer or a planter.

18. A method comprising using the agricultural zone management system of claim 1 to treat each equipment zone of the agricultural field based on the variable rate prescription.

* * * * *